US006441508B1

(12) United States Patent
Hylton

(10) Patent No.: US 6,441,508 B1
(45) Date of Patent: Aug. 27, 2002

(54) DUAL TYPE MULTIPLE STAGE, HYDRAULIC TURBINE POWER GENERATOR INCLUDING REACTION TYPE TURBINE WITH ADJUSTABLE BLADES

(75) Inventor: Everett Hylton, Reno, NV (US)

(73) Assignee: EBARA International Corporation, Sparks, NV (US)

( * ) Notice: Subject to any disclaimer, the term of this patent is extended or adjusted under 35 U.S.C. 154(b) by 0 days.

(21) Appl. No.: 09/735,339

(22) Filed: Dec. 12, 2000

(51) Int. Cl.[7] .......................... F01D 15/10; F02C 6/00; H02K 7/18; H02P 9/04; F03B 3/00

(52) U.S. Cl. .......................... 290/52; 415/81

(58) Field of Search .......................... 290/52

(56) References Cited

U.S. PATENT DOCUMENTS

| | | | | |
|---|---|---|---|---|
| 3,660,746 A | | 5/1972 | Milek | 318/696 |
| 3,794,456 A | * | 2/1974 | Jelusic | 415/122 |
| 4,049,972 A | * | 9/1977 | Crowdy et al. | 290/52 |
| 4,064,403 A | * | 12/1977 | Miller | 290/52 |
| 4,188,546 A | * | 2/1980 | Kossler | 290/52 |
| 4,224,526 A | * | 9/1980 | Margison et al. | 290/52 |
| 4,362,020 A | * | 12/1982 | Meacher et al. | 60/657 |
| 4,367,890 A | * | 1/1983 | Sprik | 290/52 |
| 4,392,063 A | * | 7/1983 | Lindquist | 290/54 |
| 4,424,452 A | * | 1/1984 | Francis | 290/55 |
| 4,441,029 A | * | 4/1984 | Kao | 290/52 |
| 4,464,580 A | * | 8/1984 | Miller et al. | 290/52 |
| 4,629,904 A | * | 12/1986 | Rojo, Jr. et al. | 290/52 |
| 4,739,180 A | * | 4/1988 | Yanoma et al. | 290/2 |
| 4,806,781 A | * | 2/1989 | Hoshstetter | 290/43 |

(List continued on next page.)

FOREIGN PATENT DOCUMENTS

| | | | |
|---|---|---|---|
| EP | 000568723 A1 | * | 10/1993 |
| JP | 06-335197 | * | 2/1994 |

OTHER PUBLICATIONS

Fluid Mechanics—8th Edition, by V.L. Streeter & E.B. Wylie—McGraw–Hill, Inc. pp. 396–402.

Kimmel, Hans E., Power Generation UsingBalanced Hydraulic Turbines, American Power Conference, vol. 60–1, 1998 pp. 200–204.

D. Japikse & N. Baines, Introduction To Turbomachinery Oxford University Press, Figs. 1.4 & 1.5.

Kimmel, Hans E., Two Phase Turbine Expanders in Cryogenic Gas Processing, A1CHE 1999 Spring Meeting, Mar. 17, 1999, Paper #126e, 17 pages.

Kimmel, Hans E., Speed Controlled Turbine Expanders, Hydrocarbon Engineering Mag/Jun. 1997, 4 pages, Reprint.

VA Tech Escher Wyss Controllable Pitch Propellers, print out of Internet site:www.voesthydro.com/cpp.htm, Oct. 13, 2000, 3 pages.

Printouts of Internetsite: www.voesthydro.com of Turbine Installations with varying blade characteristics 10/00, 5 pages.

*Primary Examiner*—Nestor Ramirez
*Assistant Examiner*—Pedro J. Cuevas
(74) *Attorney, Agent, or Firm*—Edward J. DaRin, Esq.

(57) ABSTRACT

A hydraulic turbine power generator mounted on a single shaft wherein the hydraulic turbine means includes a plurality of reaction type turbine stages arranged to be in combination, rotatably responsive to the hydraulic fluid coupled to the turbines. One of the turbine stages having axial turbine runner means mounted to the single shaft and having a plurality of adjustable blades for permitting the pitch of the blades to be adjusted for controlling the effective operative fluid head to cause the shaft to rotate at a preselected speed and including means for adjusting the pitch of the adjustable blades. The turbine stages can be a Francis type turbine and a Kaplan type turbine. The hydraulic turbine power generator can be oriented in an upward direction to cause the fluid flow to travel upwardly through the turbine stages and function as a two phase turbine expander resulting in the separation of the liquid phase from the gas/vapor stage.

21 Claims, 11 Drawing Sheets

U.S. PATENT DOCUMENTS 4,994,684 A * 2/1991 Lauw et al. .................. 290/52
5,040,945 A * 8/1991 Levesque ................. 415/124.1
5,285,123 A * 2/1994 Kataoka et al. ............... 310/88
5,376,827 A * 12/1994 Hines .......................... 290/52
5,659,205 A 8/1997 Weisser ....................... 290/52
5,754,446 A * 5/1998 Fisher, Jr. et al. .......... 364/494
5,780,935 A * 7/1998 Kao ............................ 290/52
5,905,311 A * 5/1999 Hess et al. .................... 290/52

* cited by examiner

SOURCE OF HYDRAULIC FLUID
12
RBT
HTPG
10
SS
DC
7
PG
9
8
CV
CH
TEM
RB
6
5
R
HT
4
2
1
14
13

SOURCE OF HYDRAULIC FLUID

12
RBT
HTPG
SS
DC
7
PG
9
8
CV
CH
TEM
RB
6
5
R
HT
4
2
1

1
42
42
55
47
48
7
9
POWER
AND
DIGITAL
INFORMATION

NM
CH
TPD
RB
HS
SS
FLUID
DISCHARGE
TP
TEM
FLUID
INLET
R
WR-2
CV
WR-1

12
9
7
PG
SS
47

1
155
44
45

47
55
17
42
46
42
155
1
45

VAPOR
VO

KAPLAN RUNNER ASSEMBLY
FRANCIS TYPE RUNNER ASSEMBLIES
DC
CC
HTPG
SS
PG
LIQUID
LO
SB
SOURCE OF 2 PHASE HYDRAULIC FLUID

MIXTURE OF LIQUID
& VAPOR / GAS
KAPLAN RUNNER
ASSEMBLY
TURBINE STAGES
DC
SS
HTPG
PG
SOURCE OF
HYDRAULIC
FLUID

DUAL TYPE MULTIPLE STAGE, HYDRAULIC TURBINE POWER GENERATOR INCLUDING REACTION TYPE TURBINE WITH ADJUSTABLE BLADES

FIELD OF INVENTION

Hydraulic Turbine Power Generator incorporating a plurality of Reaction type turbine stages including a turbine stage with adjustable blades for maximizing turbine efficiency and controlling the output electrical frequency of the power generator.

BACKGROUND OF INVENTION

This invention is an improvement of the Hydraulic Turbine Power Generator that is the subject of the Weisser U.S. Pat. No. 5,659,205, assigned to the same assignee as the present invention. The hydraulic turbine of U.S. Pat. No. 5,659,205 is operable with a hydraulic fluid source that has a variable flow rate and a high pressure and is converted by the turbine structure to a relatively high fluid velocity. The turbine runner blades disclosed in the prior patent are fixed, axial runner blades so that the rotary speeds imparted to the single shaft mounting the hydraulic turbine and power generator is operative at variable, rotary speeds. The power generator is provided with a variable frequency exciting current source controlling the synchronous speed of the generator to be changed by connecting the power generator stator windings to be energized by the variable frequency exciting current source thereby providing output power at a preselected, constant frequency to compensate for the variable output frequencies generated in response to the variable shaft speeds of the single shaft mounting the power generator. Experience with the patented hydraulic power generator has resulted in that the need for the variable speed, constant frequency controller, identified in the above identified prior patent as element IS, has produced problems due to the operational problems encountered with the commercially available controller IS. This problem has resulted in the desirability of providing a hydraulic turbine power generator and more particularly submersible hydraulic turbine power generator operative with preselected hydraulic fluids that eliminate the need for the use of the variable speed, constant frequency controller to thereby provide a power generator free of the frequency controller problems.

SUMMARY OF INVENTION

The present invention provides an improved hydraulic turbine power generator arranged on a single shaft that is operable as a submersible hydraulic turbine electrical power generator that is operative at a constant speed and provides output power at a constant frequency without the need for a variable speed, constant frequency controller for the power generated resulting in a relatively trouble free hydraulic turbine electrical power generator.

The basic concept of the present invention is the incorporation of a plurality of reaction type turbine stages arranged in serial fashion on the single shaft for the hydraulic turbine power generator with the output stage of the hydraulic turbine being responsive to the fluid flow discharged from the input turbine stage or stages and being characterized as having a plurality of adjustable blades that permit the pitch of the blades to be adjusted for varying the fluid flow through the output stage to achieve a substantially constant speed for the single shaft mounting the hydraulic turbine and electrical power generator and maximizing the efficiency of the turbine. The input turbine can be a Francis type turbine stage of single or a plurality of stages while the output turbine stage can be a Kaplan type turbine stage.

In accordance with the present invention the adjustable pitch blades can be rotated to any desired position by either statically moving the blades when the turbine is inoperative or by dynamically adjusting the turbine blades when the turbine is operative. In the disclosed static adjustment of the adjustable turbine vanes, the hydraulic turbine mounts a supporting structure adjacent the fluid discharge end thereof for mounting an electrical motorized device operable to extend a keyed blade for adjustment purposes. A gear drive system is imbedded into Kaplan style turbine runner for controlling the pitch of the runner blades of the Kaplan style turbine runner so that the efficiency of the turbine can be fine tuned. The keyed blade is adapted to fit into a positioning shaft controlling the movements of the gear drive system. This static adjustment is accomplished while the turbine is inoperable and when the adjustment is complete, the keyed blade is retracted and the turbine is in condition to be operated at the adjusted pitch for the runner blades.

The dynamic adjustment of the Kaplan style runner blades is accomplished while the turbine is operative by the use of a gear drive system imbedded into the Kaplan style runners also controlled by a positioning shaft. In this case, a low voltage stepper motor incrementally controls the positioning shaft and thereby the pitch of the runner blades with the turbine in operation. The stepper motor is powered from the turbine electrical power generator by tapping off the rotor end rings and with the stepper motor being responsive to digital positioning commands. The power flow in the rotor is low voltage and low frequency of approximately 20 Hertz while the digital signals are transmitted to the stepping motor through the turbine electrical power generator rotor by means of the magnetic field across the gap between the rotor and stator of the power generator.

The use of the turbine with adjustable blades is also advantageous when the source of hydraulic fluid is in two phases, namely a liquid and gas/vapor mixture. In this embodiment, a turbine expander is used for permitting pressure reduction into the vapor phase but takes advantage of the buoyant and convective forces of released gas or vapor by routing the fluid in a vertical direction such that the fluid is aided by these forces as contrasted with the reverse or downward, conventional flow. The reverse fluid flow mixture through the turbine causes the rise of the bubbles of released gas or vaporized liquid aids the primary fluid flow. The entire hydraulic turbine electrical power generator is arranged in a closed container with suitable fluid inlet and a separate fluid outlet and gas/vapor outlet so as to function as a separator of the gas/vapor from the liquid.

BRIEF DESCRIPTION OF THE DRAWINGS

These and other features of the present invention may be more fully appreciated when considered in the light of the following specification and drawings, in which.

DETAILED DESCRIPTION OF PREFERRED EMBODIMENTS OF THE INVENTION

Figure 1:
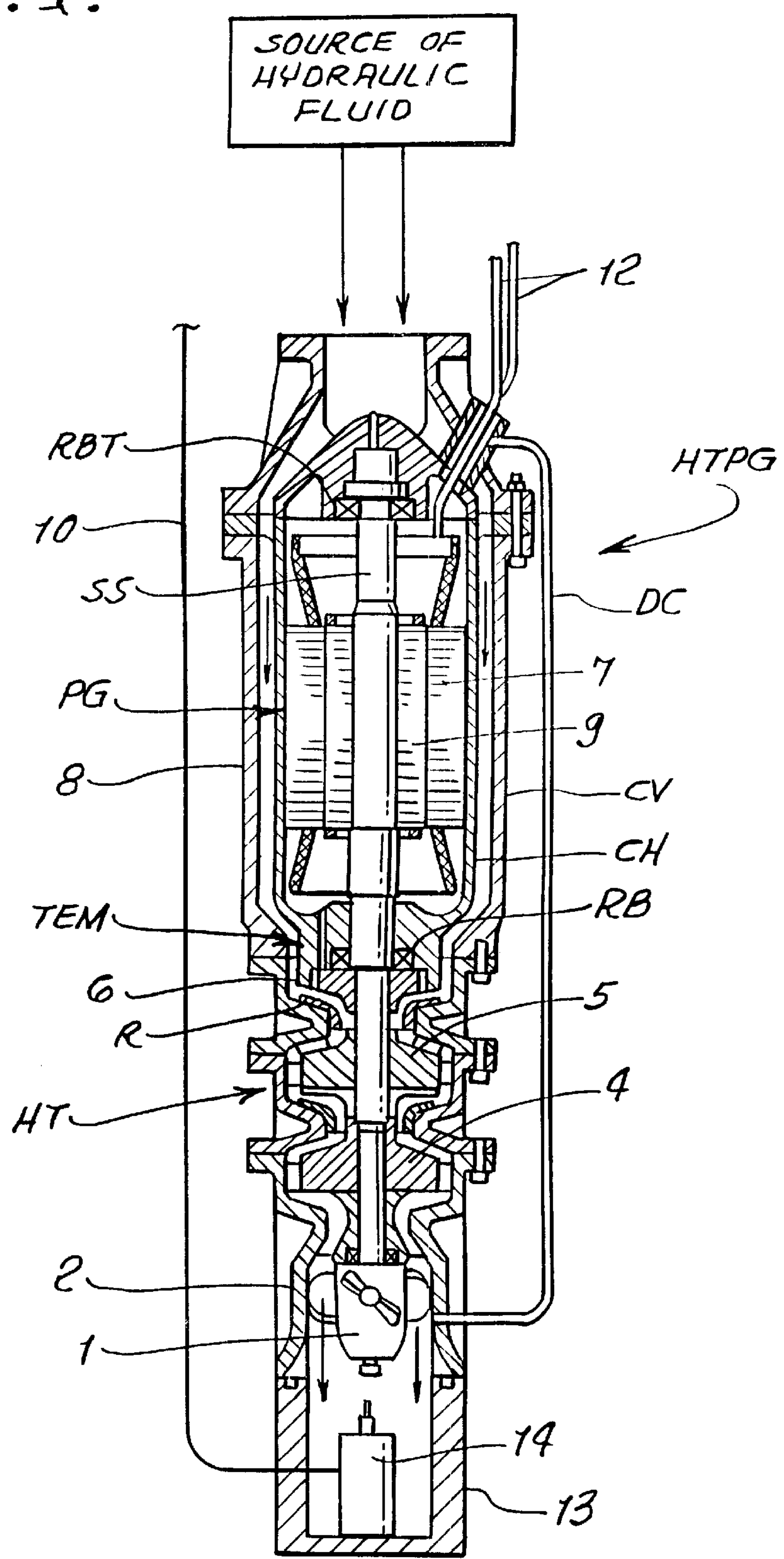
FIG. 1 is a cross-sectional view of a submerged hydraulic turbine electrical power generator operative at a preselected speed and including a static means for adjusting the turbine blades pitch to achieve the preselected speed and embodying the present invention.

Now referring to the drawings, the hydraulic turbine electrical power generator of the present invention operative at a preselected single speed and thereby a single electrical frequency for the generated electrical power will be described in detail. The hydraulic turbine electrical power generator HTPG is illustrated in the drawings and will be described for use as a submerged hydraulic turbine power generator HTPG to be operative as a submerged hydraulic turbine generator HT to be operative in response to cryogenic, liquefied gases coupled to the hydraulic turbine. The hydraulic turbine HT and the electrical power generator PG are both mounted on a single shaft SS. For the purposes of the present invention, the terms "hydraulic fluids" or "hydraulic fluid flow" is an operative hydraulic fluid for operating the hydraulic turbine HT and cooling the electrical power generator PG are electrically, non-conductive fluids, including cryogenic liquefied gases, such as liquefied natural gases, liquefied methane gas, liquefied ethylene gas, liquefied petroleum gas, and similar liquefied hydrocarbons. The usual source of hydraulic fluids provides the fluid at a varying or constant pressure and velocity such as may be obtained from wells, etc.

The hydraulic turbine HT and the electrical power generator PG are mounted on a single shaft SS to be rotatable in unison therewith upon the application of a preselected hydraulic fluid flow to the hydraulic turbine HT for causing the shaft to be rotated in response to the hydraulic pressure and velocity of the selected hydraulic fluid applied.

Figure 6:
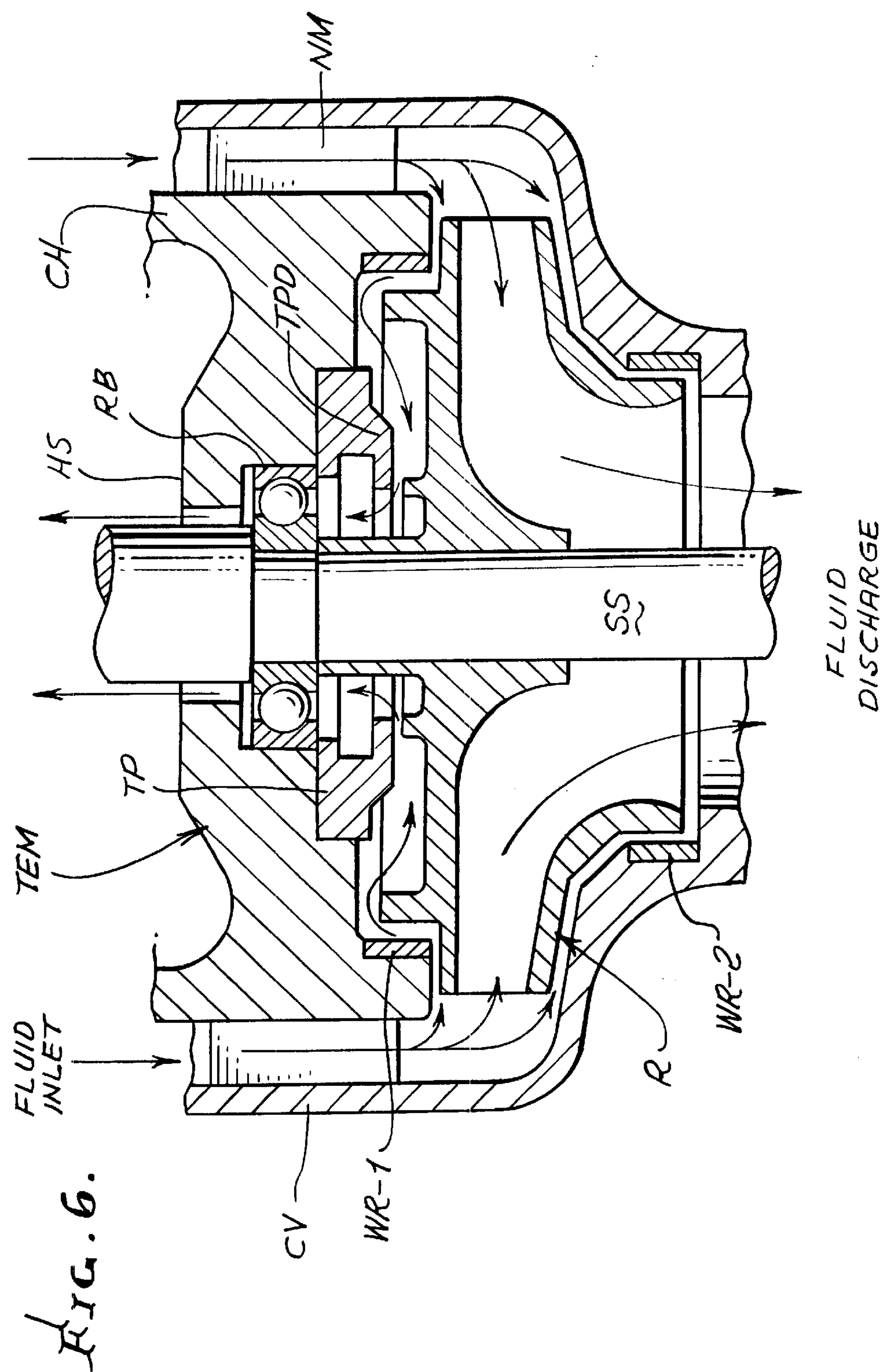
FIG. 6 is a partial, cross-sectional view illustrating the thrust equalizing mechanism having its variable orifice open and illustrating the hydraulic fluid flow through the turbine runner, thrust equalizing mechanism and ball bearing.
Figure 7:
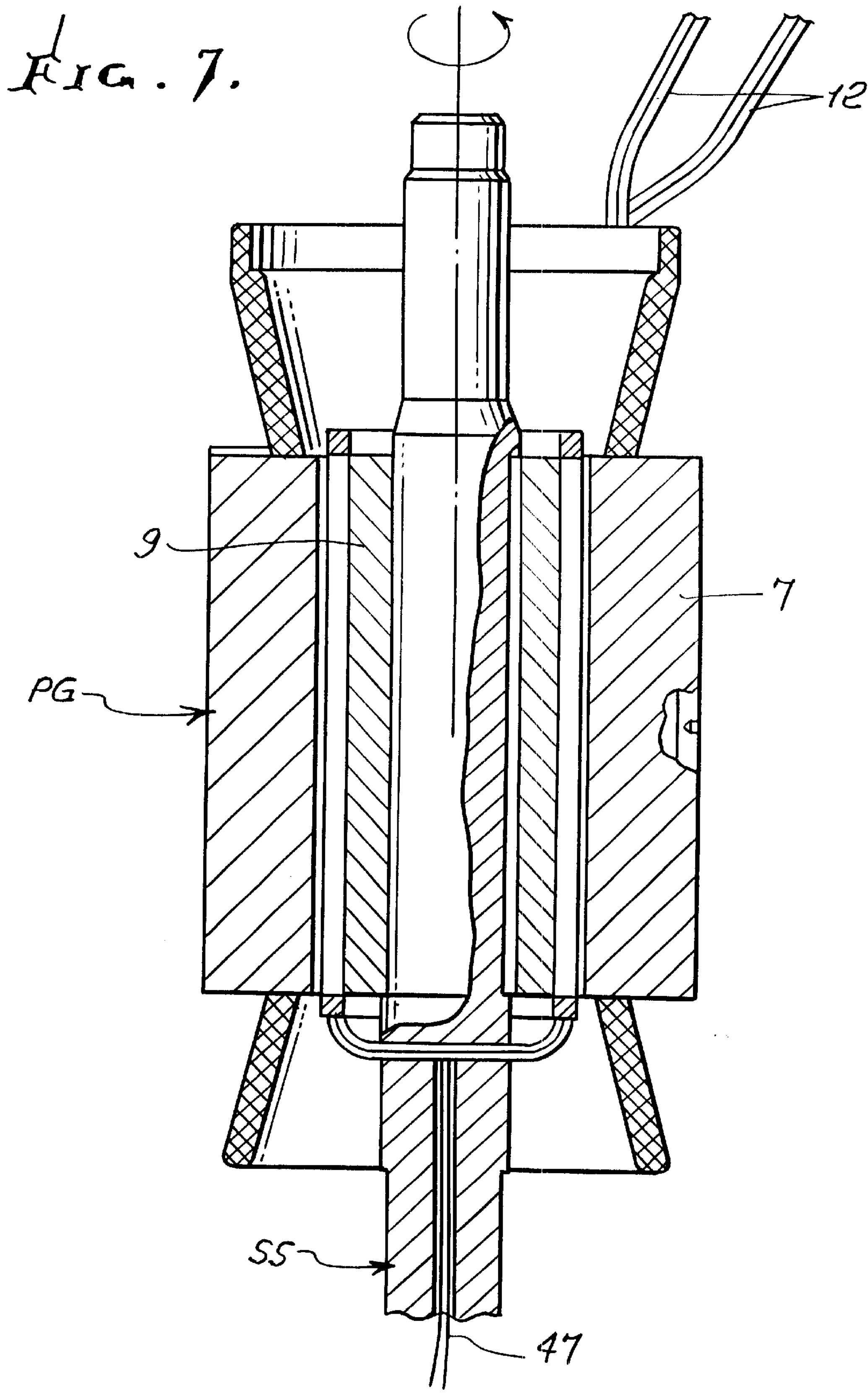
FIGS. 7–9 are partial, cross-sectional views of the turbine power generator shaft of FIG. 3 and illustrating the energization arrangement of the stepper motor from the electrical power generator.
Figure 8:
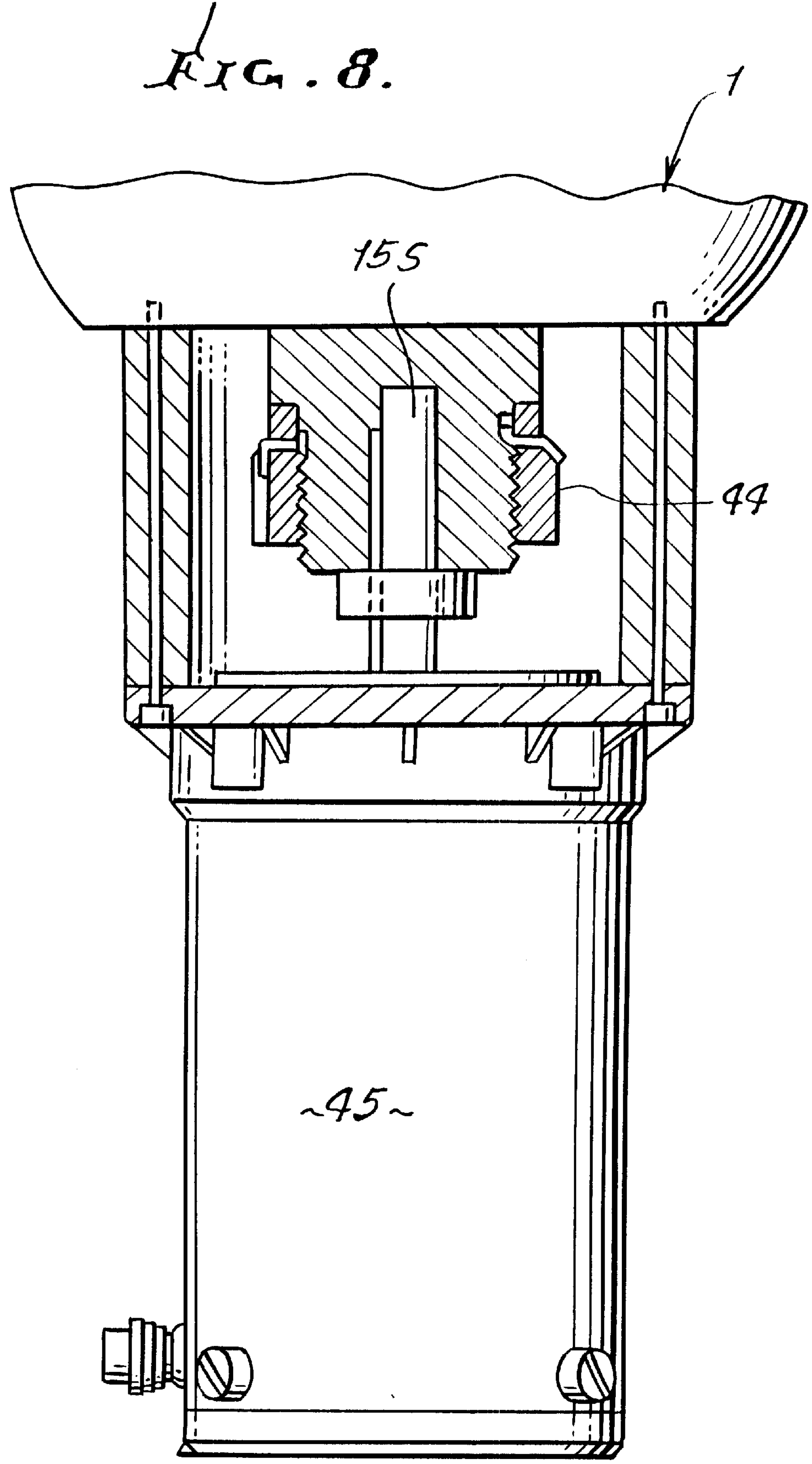
Figure 9:
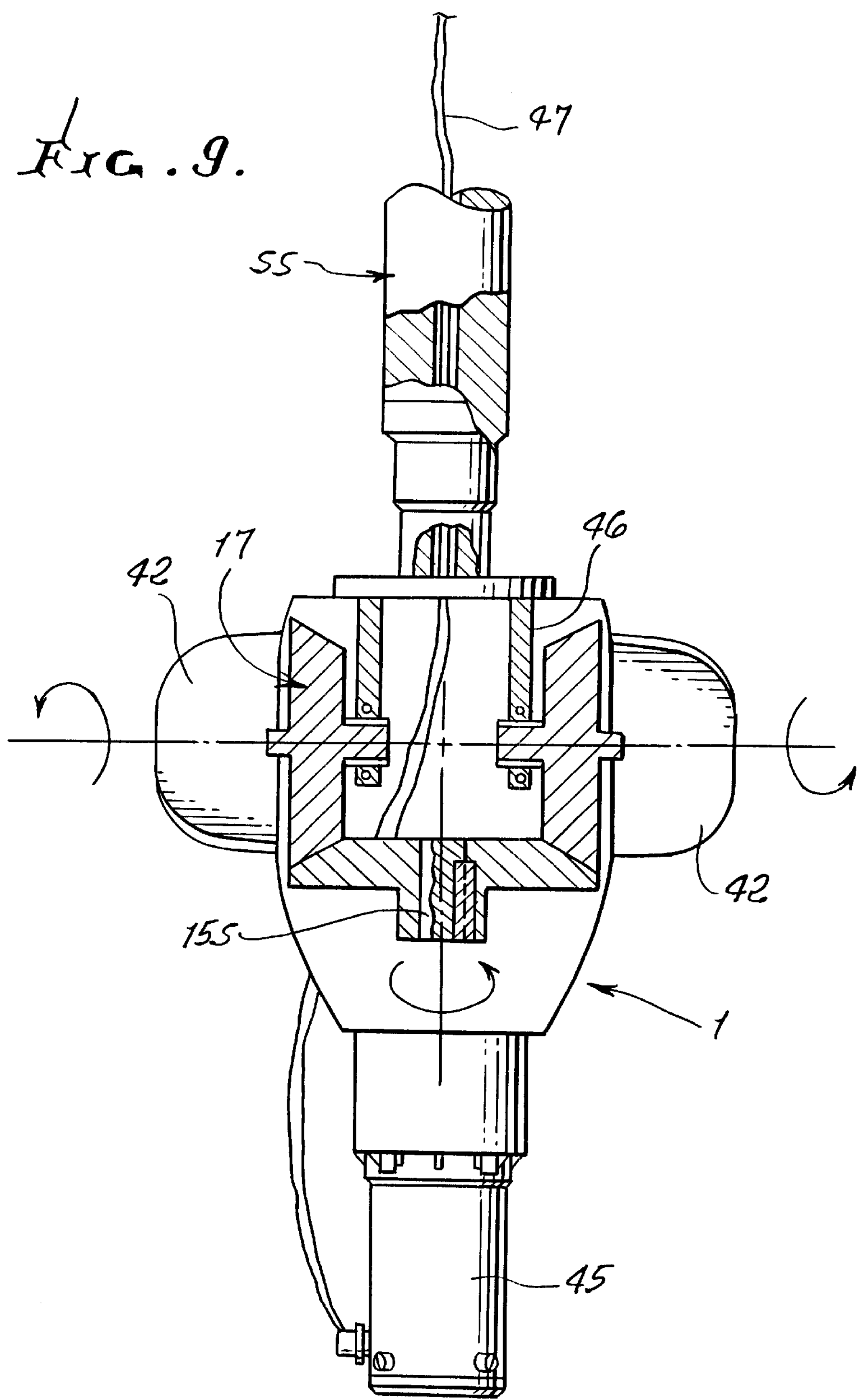

As contrasted with the hydraulic turbine power generator disclosed in the aforementioned U.S. Pat. No. 5,659,205, the hydraulic turbine HT of the present invention is a multiple stage reaction turbine of the type disclosed in said '205 patent and as disclosed in the Proceedings of the American Power Conference, Volume 60-1 sponsored by the Illinois Institute of Technology in Chicago in 1998, pages 200–204. The thrust equalizing mechanism, TEM, disclosed in both aforementioned patent and publication are incorporated into the hydraulic turbine power generator HTPG of the present invention. The operation of the thrust equalization mechanism TEM described in the '205 patent and the Proceedings of the American Power Conference referenced hereinabove are incorporated herein by reference. To the same end, the detailed arrangement of the thrust equalization mechanism TEM for the present invention is best appreciated from viewing FIG. 6. The mechanism TEM is operative with the lower bearing RB for the shaft SS, best illustrated in FIG. 6, to be operative with the turbine runner R. The shaft SS is also provided with a second ball bearing, or the top shaft radial bearing RBT which has a portion of a reduced diameter from the adjacent portion of the shaft SS. This arrangement of the components is considered to be the "shaft assembly" since they are rotated at the speed of the shaft SS and axially movable with the bidirectional movements imparted to the shaft SS and the ball bearing RB in accordance with the operation of the thrust equalizing mechanism TEM.

Figure 2:
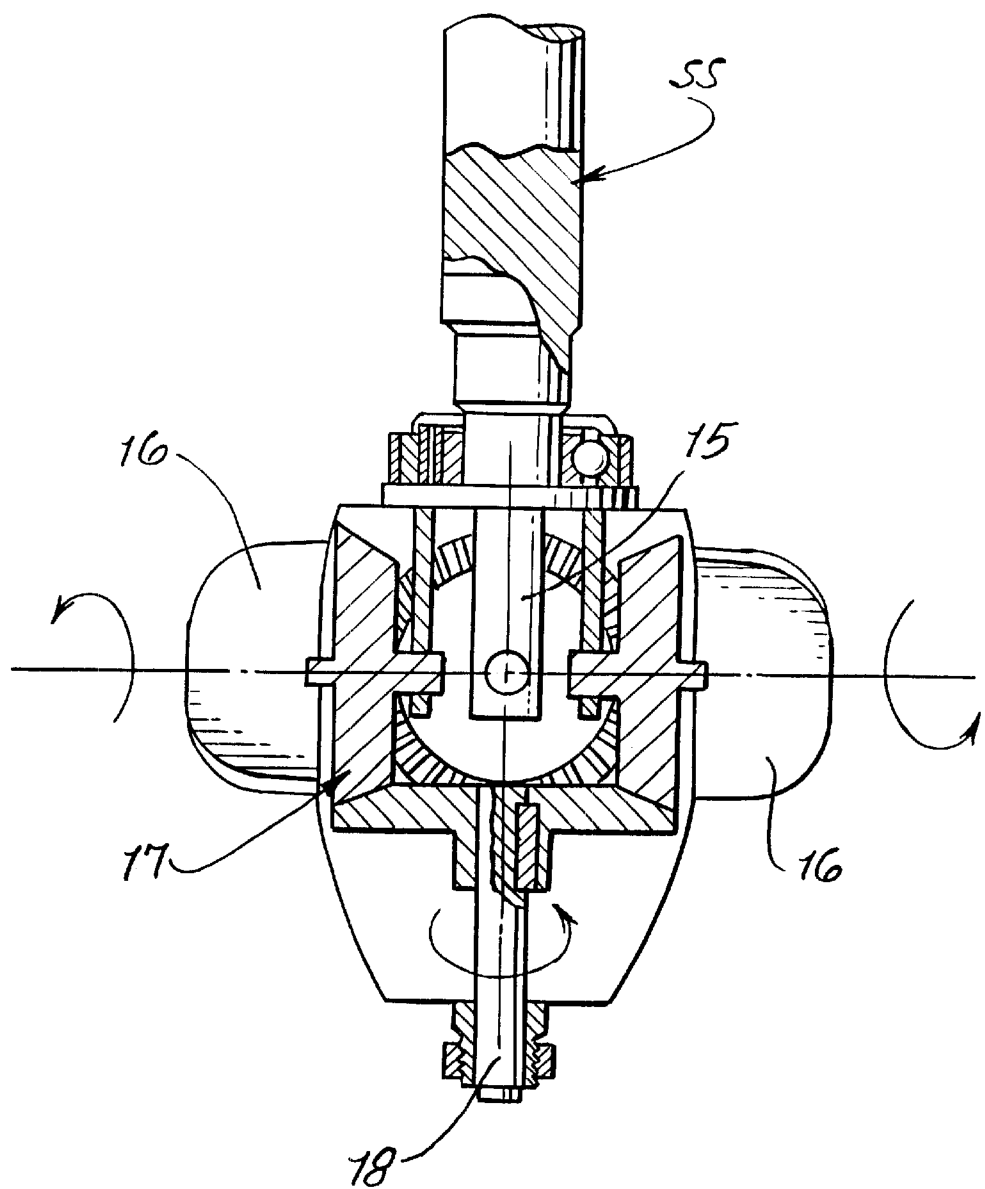
FIG. 2 is a partial cross-sectional view of the Kaplan style runner assembly of FIG. 1 illustrating the gear drive system for adjusting the turbine blades pitch.

The above described shaft assembly is housed within a common housing CH for enclosing and isolating the components of the "shaft assembly" along with the lower portion of the shaft SS except for the turbine runner R and the remaining portion of the shaft SS, all as illustrated in FIG. 1. The common housing CH is submerged in a containment vessel CV that encloses the entire hydraulic turbine electrical power generator HTPG in a spaced relationship with the common housing CH. The containment vessel CV is provided with a fluid inlet for receiving the hydraulic fluid from the fluid source illustrated as a block coupled to the vessel CV. The hydraulic fluid is discharged from the lower end of the shaft SS, as illustrated in FIG. 1. The space between the housing CH and the vessel CV is provided with nozzle means NM, see FIG. 6, opposite the housed turbine stages for serially impinging on the turbine runners. The turbine stages illustrated in FIG. 1 consists of three stages of a Francis type turbine stages identified as the stages 4, 5, and 6, with the later stage incorporating the thrust equalizing mechanism TEM therein. The last Francis type turbine stage discharges into the Kaplan type runner assembly identified as the stage 1 and housed within the draft tube 2. The draft tube 2 is utilized to aid the turbines in the recovery of fluid pressure by slowing down the flow and increasing the back pressure at the Kaplan runner assembly. As in the prior art, the single shaft SS mounts the electrical power generator PG in the form of an induction generator. The induction generator PG illustrated in FIG. 1 has its rotor 9 mounted to the shaft SS to be rotatable therewith at the speed imparted to the shaft by the turbine stages. The generator stator is identified as the element 7 and is within the concentric housing 8. The electrical power generated by the element PG, is available at the power cables 12. The Kaplan runner assembly constructed with adjustable blades 16 for controlling the speed of the shaft SS is best appreciated from viewing FIG. 2. The adjustable runner blades 16 for the Kaplan turbine runner is provided with a gear drive assembly 17 comprising bevel gears fixed to the runner by mechanical means 15. The main bevel gear drives four minor gears attached to each of the turbine blades. The rotation of the main gear rotates the minor gears thereby adjusting the pitch of the runner blades. A runner blade positioning shaft 18 is used for rotating the gear drive assembly 17. The end of the positioning shaft 18 is keyed to accept an adjusting blade for adjusting the position of the turbine blades.

As is illustrated in FIG. 1 a runner blade adjusting means 14 that has a motor actuated blade that is operable to extend and retract a keyed blade into the exposed end of the adjustment shaft 18. For this purpose the runner blade adjusting means 14 is supported by a mounting bracket 13 secured to the end of the draft tube 2, as illustrated. The motor for the adjusting means 14 is powered by means of the power and control cable 10 that power adjusting means 14 and control the commands for positioning the keyed blade into and out of engagement with the positioning shaft 18.

The ability to adjust the pitch of the Kaplan turbine blades allows the fluid flow through the turbine to be controlled in a manner similar to a control valve so that rotary speed of the shaft SS can be controlled and maximize the efficiency of the combination of the different types of turbines.

Figure 3:
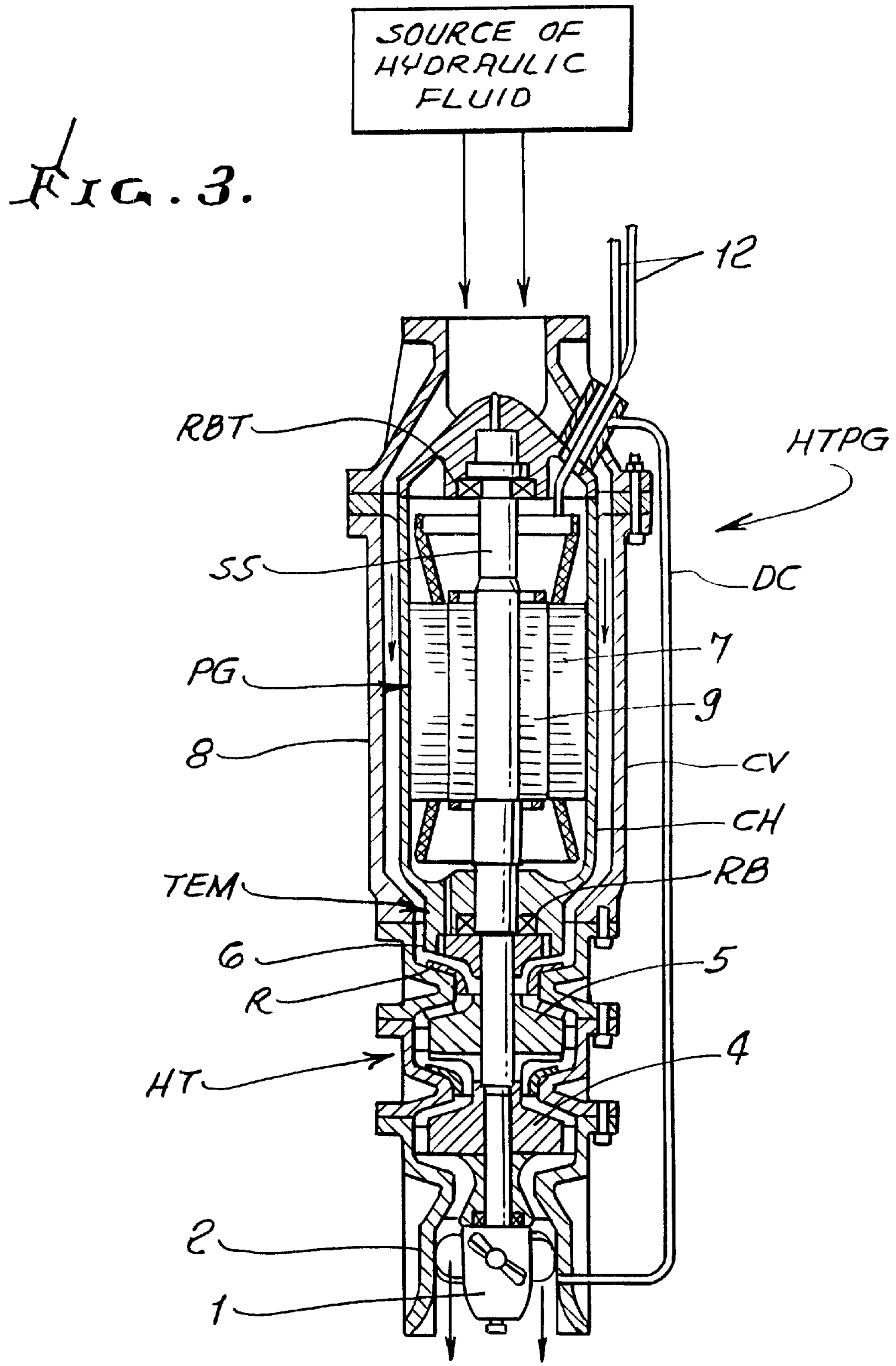
FIG. 3 is a cross-sectional view of a submerged hydraulic turbine electrical power generator operative at a preselected speed and including dynamic means for adjusting the turbine blade pitch to achieve the preselected speed and embodying the present invention.
Figure 4:
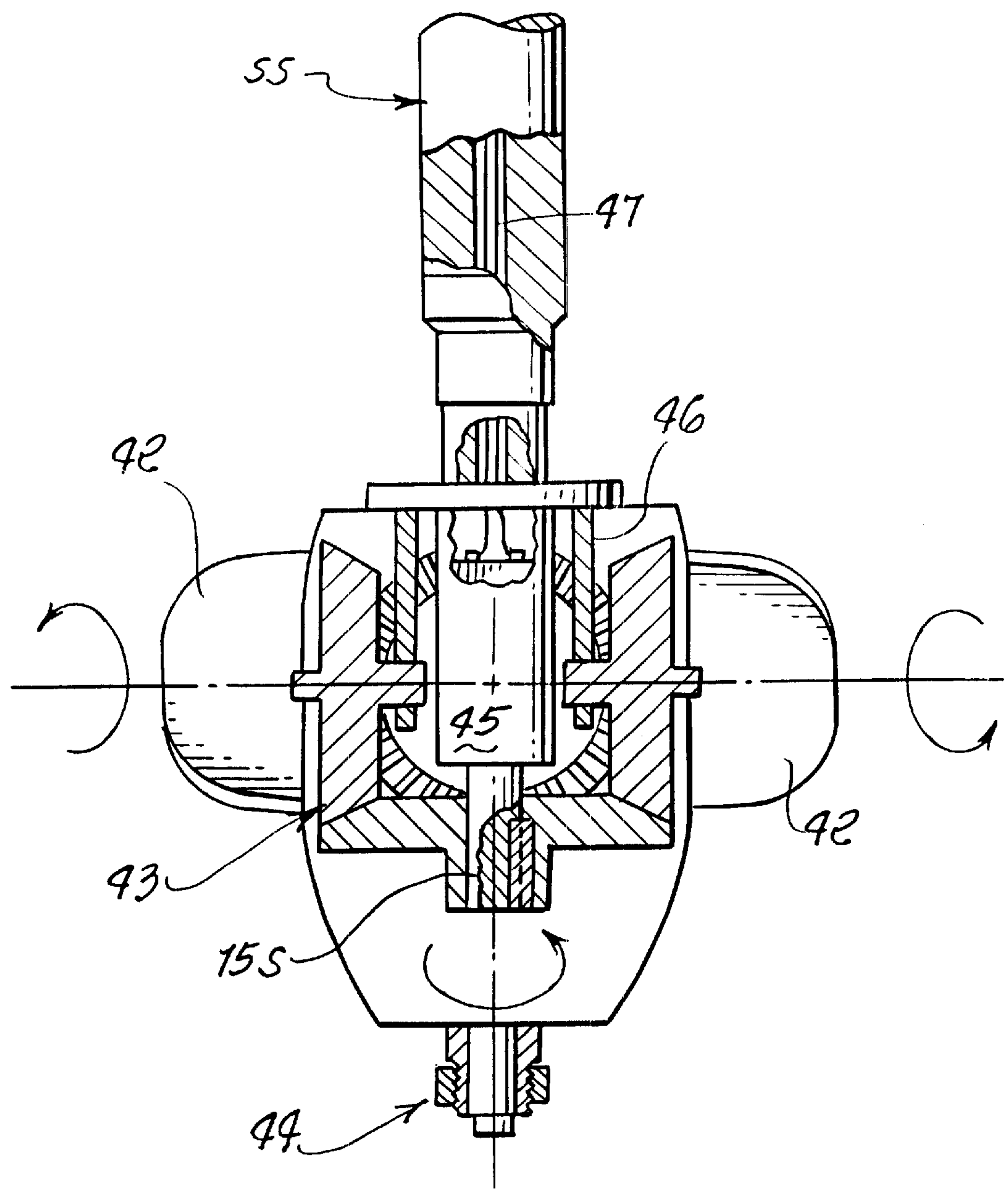
FIG. 4 is a partial, cross-sectional view of the Kaplan style runner assembly of FIG. 3 illustrating the gear drive system controlled by a stepper motor powered from the turbine power generator.
Figure 5:
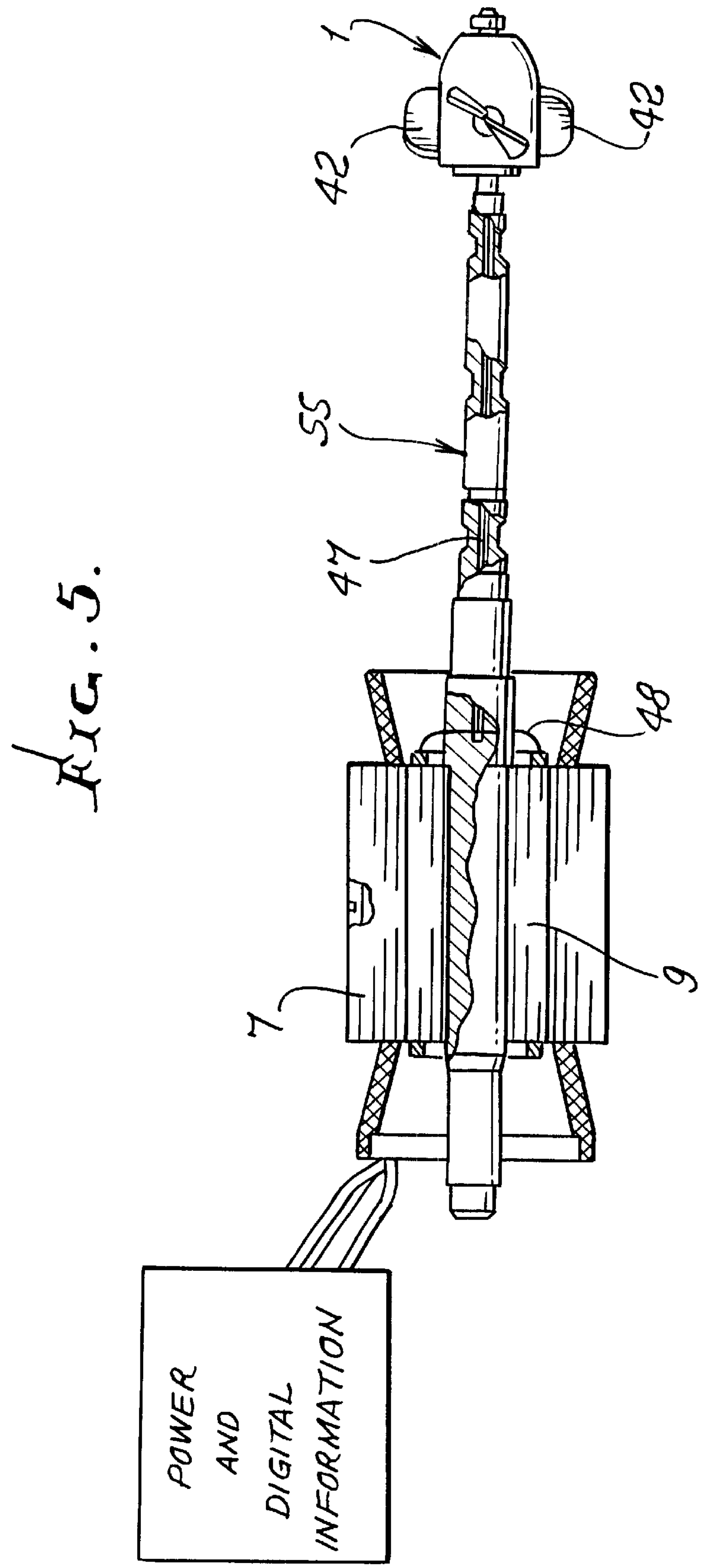
FIG. 5 is a diagrammatic, detached view of the common turbine power generator shaft of FIG. 3 illustrating the energization and control of the stepper motor for adjusting the pitch of the turbine blades.

The embodiment of FIG. 3 as to the hydraulic turbine power generator HTPG is the same as that illustrated for FIG. 1 except that the gear drive assembly 17 is dynamically adjusted, as best seen in FIG. 4. In FIG. 4, the adjustable blades for the Kaplan runner assembly are identified by the number 42 in FIG. 4 and the gear drive assembly 43 of FIG. 4 is the same as the gear drive assembly 17 of FIG. 2. In this embodiment (FIG. 4) the gear drive assembly 43 is controlled by means of a conventional stepping motor 45 having a positioning shaft 15S coupled to the gear drive assembly 43 for varying the pitch of the adjustable blades 42. Stepping motors are well known in the prior art and one such motor is disclosed in U.S. Pat. No. 3,660,746. The stepper motor 45 is energized from the induction generator PG coupled by the lead wires 47, as illustrated in the drawings, FIGS. 4–9. The lead wires 47 are arranged in a central aperture provided in the shaft SS. The power leads 48 are tapped off opposite sides of the rotor 9 end rings as shown in FIG. 5. The leads 47 transmit both the electrical power for the stepping motor 45 and the digital commands for incrementally stepping the positioning shaft 15S to achieve the desired pitch for the blades 42 and thereby the desired shaft speed and electrical output frequency. The gear mounts 46 are the mechanical means for fixing the gears to the runner blades 42. The end cap 44 illustrated in FIG. 4 is a detachable cap that bolts into place and secures the gears and the runner blades 42 to the shaft SS.

It should now be evident that the hydraulic turbine power generator HTPG needs to be operative in order to vary the pitch of the Kaplan runner assembly as the pitch is controlled by the stepping motor 45 and is energized from the induction generator PG.

It should be recognized that an important feature of the disclosed embodiments is the selection of the type of hydraulic turbines to be utilized for the purposes of the invention. The hydraulic turbine means comprise at least a plurality of reaction type turbine stages arranged to be in combination, to be rotatably responsive to a fluid flow coupled to the turbine whereby the rotary speed of the common shaft can be controlled to achieve a preselected shaft speed. The plurality of reaction type turbine stages are preselected to have reverse performance characteristics. One of the turbine stages having radial turbine runner means to be rotatably responsive to the hydraulic fluid coupled thereto for rotating the common shaft. One such turbine is a Francis type turbine of a single or multiple stages. The second reaction type turbine has an axial turbine runner means with adjustable blades for permitting the pitch of the blades to be adjusted for controlling the effective operative fluid head for the turbine means to cause the shaft to rotate at a preselected speed and thereby a preselected electrical frequency for the generated power. The Kaplan type turbine means is suitable for this purpose.

Figure 10:
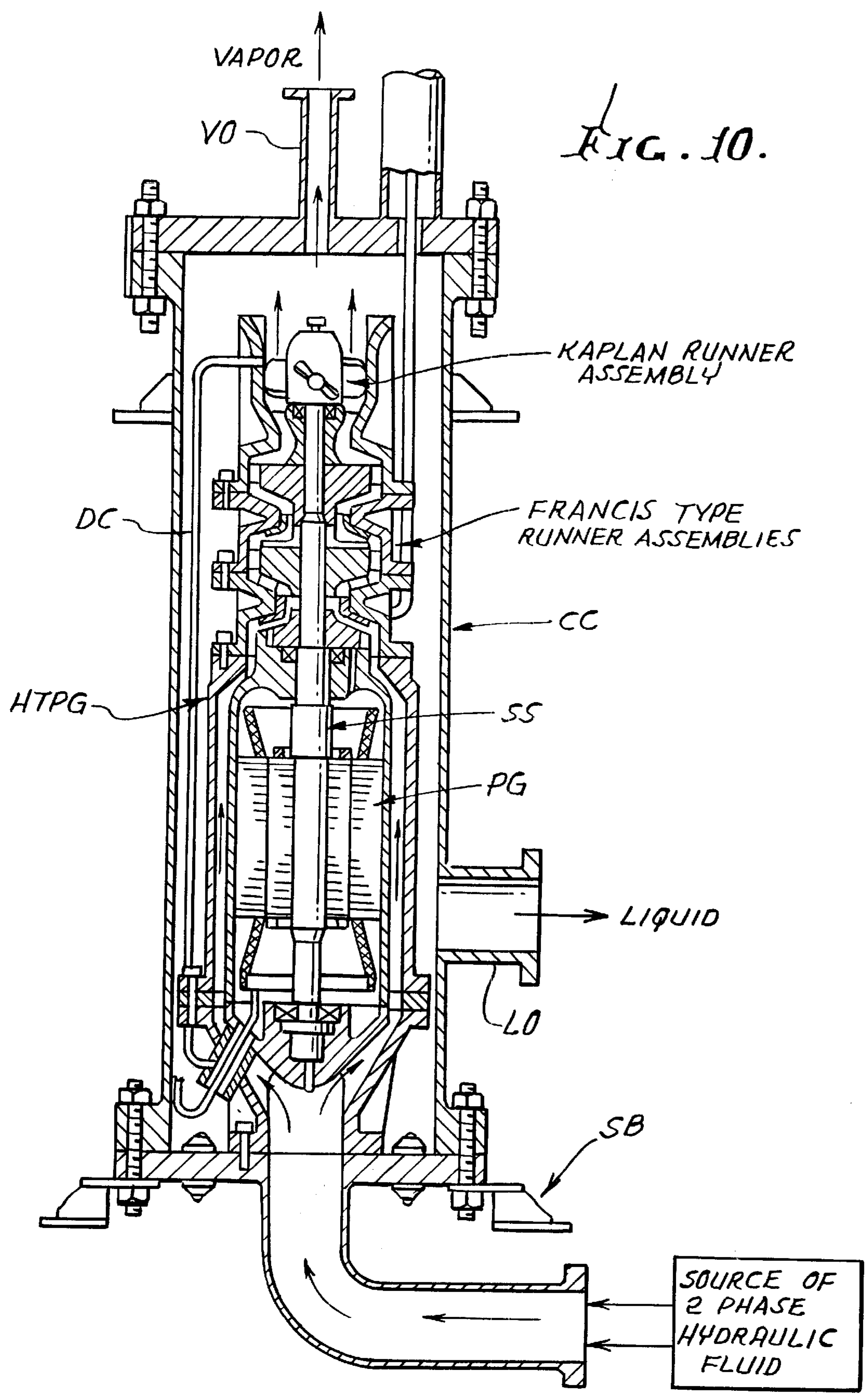
FIG. 10 is a cross-sectional view of the turbine expander of FIGS. 1 and 3 operative from a source of two phase hydraulic fluid arranged in a substantially closed discharge container with the fluid flow in a reverse flow arrangement from FIGS. 1 and 3 and functioning as a two phase separator of the liquid stream from the gas/vapor portion of the mixture.

The above embodiments are operative with the above described liquefied gases without any gases or vapors therein or single phase turbine expanders. The embodiment of FIG. 10 utilizes the hydraulic turbine power generators HTPG for use with hydraulic fluid sources of two phases, namely a liquid and a gas/vapor phase in a mixture or in combination. Two phase turbine expanders used in cryogenic gas processing have been disclosed in the prior art. One such publication is the Dr. Hans Kimmel et al publication presented at AlCHE 1999 Spring National Meeting of the American Institute of Chemical Engineers on Mar. 17, 1999, paper number 126e, 17 pages. In this disclosure of a two phase turbine expanders were not found to be satisfactory since it has only utilized radial turbine runners. It is believed the embodiment of FIG. 10 is a superior two phase turbine expander in Cryogenic Gas Processing not disclosed in the known prior art. It will be appreciated that the hydraulic turbine power generator HTPG illustrated in FIG. 10 is the same as illustrated in FIGS. 1 and 3 without the detailed illustration of the means for adjusting the blades of the Kaplan runner assemblies. These features will be included in any practical device but are omitted for simplifying the understanding of the present invention. In examining FIG. 10 it will be noted that contrary to the fluid flow in the previous embodiments wherein the fluid flow is in a downward direction the primary fluid flow is reversed or in an upward direction as illustrated. This upward flow direction, the rise of the bubbles of released gas or vaporized liquid aids the primary fluid flow. For the purpose of processing a two phase fluid source the entire mechanism HTPG is enclosed in a substantially closed discharge container means or a discharge pressure vessel CC. The container means CC has a fluid inlet for receiving the fluid from the source of two phase hydraulic fluid illustrated in block form at the bottom of FIG. 10, as illustrated therein. The container means CC has a vapor outlet conduit VO at the opposite end of the container means CC or at the top thereof in FIG. 10. Intermediate the top and bottom ends of the container means CC there is provided a liquid outlet conduit LO permitting the liquid phase of the hydraulic fluid to be expelled. It will be appreciated by those skilled in the art, that the high fluid pressure processed by the multi stage turbine experiences a substantial reduction in pressure in the driving of the turbine stages within the hydraulic turbine stages. The vessel CC is illustrated in FIG. 10 is supported on the support bracket SB.

During the operation of the turbine stages the gases or vapors traverse the various stages so that the liquid gas/vapor mixture exits the Kaplan runner assembly. Due to the orientation of the apparatus HTPG the gas bubbles being of light weight move out of container CC through the vapor outlet VO. The hydraulic fluid being heavier in weight in exiting the Kaplan runner assembly will drop downwardly, as illustrated in the drawing and exit the container CC at the liquid outlet LO. In this fashion the container CC functions as a two phase separator, separating the liquid from the gas/vapor.

Figure 11:
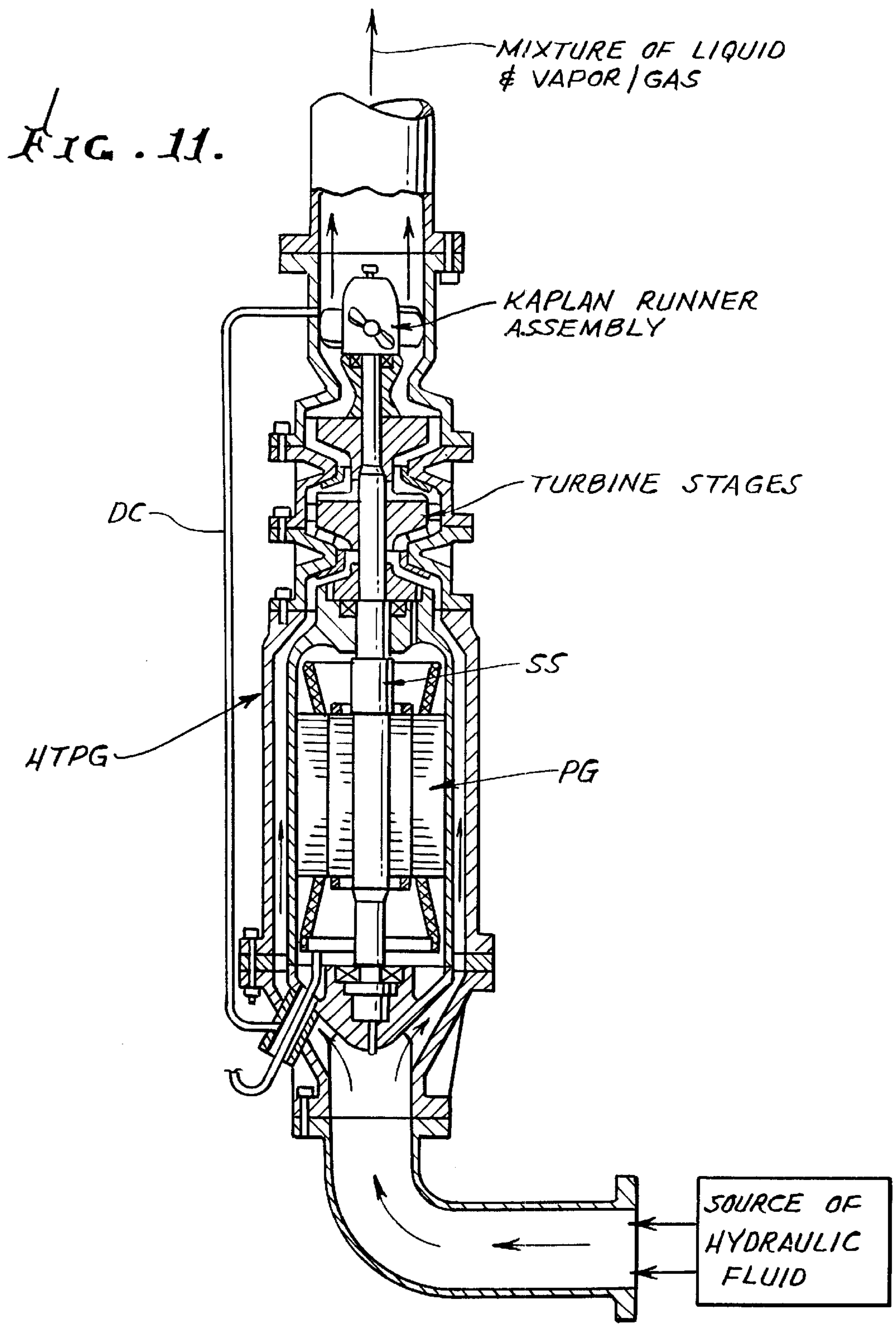
FIG. 11 is a cross-sectional view of a turbine expander of FIGS. 1 and 3 for processing two phase fluids without separating the liquids and gas/vapors and embodying the present invention.

The preferred embodiment of the two phase turbine described in conjunction with FIG. 10 is illustrated in FIG. 11. In this embodiment, the container CC is not utilized and the liquid and gas/vapor mixture is not separated. The other differences in this embodiment is that the source of hydraulic fluid coupled to the turbine means is not a two phase source but merely hydraulic fluid under pressure. The fluid inlet and fluid outlet are in line so that any released secondary gas or vapors are processed through the turbine stages and exit as a mixture from the fluid outlet.

Although the hydraulic turbine power generator HTPG described in FIGS. 10 and 11 are described in conjunction with the above described embodiment of the present invention, one of the important features of this combination of elements is the ability to adjust the pitch of the Kaplan runner assemblies that is particularly useful for these types of two phase applications. The Francis type turbine can be omitted and the variable speed hydraulic turbine can be used as a replacement along with the adjustable blade Kaplan runner assemblies. The variable speed hydraulic turbine can be the turbine disclosed in the U.S. Pat. No. 5,659,205 of Weisser. In this combination, the adjustments are both to the rotational speed and the adjustable blades. This combination has a very broad and flexible operational field and is particularly useful for the two phase turbine flow embodiment.

What is claimed is:

1. A hydraulic turbine-electrical power generator operative at a pre-selected speed comprising a single shaft assembly having first and second ends for mounting a hydraulic turbine means and an electrical power generator thereon between said ends, hydraulic turbine means mounted adjacent a first end of the single shaft, first bearing means mounted on said shaft for said turbine, said power generator comprising an electrical induction generator mounted on said shaft on the opposite side of said bearing means from said turbine means to be rotatably responsive to the rotary movements imparted to said shaft upon the operation of said turbine means and in accordance with the speed thereof, a second bearing means mounted to said shaft adjacent the second end of said shaft, said hydraulic turbine means including thrust equalizing means mounted to said shaft adjacent said first bearing means, said hydraulic turbine means comprising at least a plurality of reaction type turbine stages arranged to be in combination, rotatably responsive to a fluid flow coupled to said turbine means, a first one of said turbine stages being arranged for first receiving the fluid flow for providing torque to rotate said shaft and discharging the fluid flow at a relatively lower velocity and pressure into a second one of said turbine stages, said first one of said turbine stages comprising at least a single stage having a radial turbine runner means mounted to said shaft to be rotatably responsive to the fluid coupled thereto for rotating said shaft, said second one of said turbine stages comprising at least a single stage having an axial turbine runner means mounted to said shaft to be rotatably responsive to the fluid coupled thereto whereby the combination of said reaction type turbine means control the rotary speed of said shaft, said axial runner means being characterized as having a plurality of adjustable blades for permitting the pitch of the blades to be adjusted for controlling the effective operative fluid head for the turbine means to cause said shaft to rotate at a pre-selected speed, said axial runner means includes means for adjusting the pitch of the adjustable blades, the plurality of reaction type turbine stages are preselected to have reverse performance characteristics so that, in combination, the effective operative fluid head for the turbine means is controlled to achieve a preselected single operating speed for rotating said shaft and thereby the production of electrical current from said power generator at a single electrical frequency, common housing means for said hydraulic turbine means and said induction generator for enclosing and isolating said shaft between said first and second ends of said shaft and said turbine means including said thrust equalizing means, said housing terminating adjacent one of said turbine runner means whereby said runner means and the remaining portion of said shaft is outside said common housing, draft tube means secured to said common housing means for enclosing said last mentioned turbine runner means and adapted for coupling the fluid flow to said runner means and discharging the fluid flow therefrom, said draft tube means functioning to slow down the fluid flow and increase the back pressure at said runner means to thereby aid the turbine in the recovery of fluid pressure, containment vessel means mounted over and in spaced relationship with said common housing and said remaining portion of said shaft and extending axially outwardly of said common housing and said remaining portion of said shaft, said vessel having a fluid flow inlet adjacent said second bearing means end of said vessel and a fluid outlet at the opposite end thereof, said fluid inlet and outlet being in flow communication with each other so the fluid flow is around said common housing means, said vessel including nozzle means spaced for receiving the fluid flow from said vessel fluid inlet and converting said fluid flow into a relatively higher velocity fluid flow for impinging on said one turbine stage arranged for receiving said fluid flow for rotating said shaft.

2. A hydraulic turbine-electrical power generator as defined in claim 1 wherein the first of said turbine stages is at least a single stage of a FRANCIS type turbine and second turbine stage is a KAPLAN type turbine.

3. A hydraulic turbine-electrical power generator operative at a pre-selected speed comprising a single shaft assembly having first and second ends for mounting a hydraulic turbine means and an electrical power generator thereon between said ends, hydraulic turbine means mounted adjacent a first end of the single shaft, first bearing means mounted on said shaft for said turbine, said power generator comprising an electrical induction generator mounted on said shaft on the opposite side of said bearing means from said turbine means to be rotatably responsive to the rotary movements imparted to said shaft upon the operations of said turbine means and in accordance with the speed thereof, a second bearing means mounted to said shaft adjacent the second end of said shaft, said hydraulic turbine means including thrust equalizing means mounted to said shaft adjacent said first bearing means, said hydraulic turbine means comprising at least a plurality of reaction type turbine stages arranged to be in combination, rotatably responsive to a fluid flow coupled to said turbine means, a first one of said turbine stages being arranged for first receiving the fluid flow for providing torque to rotate said shaft and discharging the fluid flow at a relatively lower velocity and pressure into a second one of said turbine stages, said first one of said turbine stages comprising at least a single stage having a radial turbine runner means mounted to said shaft to be rotatably responsive to the fluid coupled thereto for rotating said shaft, said second one of said turbine stages comprising at least a single stage having an axial turbine runner means mounted to said shaft to be rotatably responsive to the fluid coupled thereto whereby the combination of said reaction type turbine means control the rotary speed of said shaft, said axial runner means being characterized as having a plurality of adjustable blades for permitting the pitch of the blades to be adjusted for controlling the effective operative fluid head for the turbine means to cause said shaft to rotate at a pre-selected speed, said axial runner means includes means for adjusting the pitch of the adjustable blades, said means for adjusting the pitch of the adjustable blades thereof includes gear drive means secured to said axial turbine runner means and rotatably coupled to each of said adjustable blades for permitting the pitch of the blades to be varied in accordance with the desired flow therethrough, said gear drive means comprises a main drive gear secured to said axial runner means and rotatable in response to rotary motion imparted thereto, and individual gears coupled to be driven by said main drive gear and individually secured to an individual adjustable blade, and rotatable positioning shaft coupled to said gear drive means for actuating the gear drive means in response to rotary movements imparted to said positioning shaft, the plurality of reaction type turbine stages are pre-selected to have reverse performance characteristics so that, in combination, the effective fluid head for the turbine means is controlled to achieve a pre-selected single operating speed for rotating said shaft and thereby the production of electrical current from said power generator at a single electrical frequency, common housing means for said hydraulic turbine means and said induction generator for enclosing and isolating said shaft between said first and second ends of said shaft and said turbine means including said thrust equalizing means, said housing terminating adjacent one of said turbine runner means whereby said runner means and the remaining portion of said shaft is outside said common housing, draft tube means secured to said common housing means for enclosing said last mentioned turbine runner means and adapted for coupling the fluid flow to said runner means and discharging the fluid flow therefrom, said draft tube means functioning to slow down the fluid flow and increase the back pressure at said runner means to thereby aid the turbine in the recovery of fluid pressure, containment vessel means mounted over and in spaced relationship with said common housing and said remaining portion of said shaft and extending axially outwardly of said common housing and said remaining portion of said shaft, said vessel having a fluid flow inlet adjacent said second bearing means end of said vessel and a fluid outlet at the opposite end thereof, said fluid inlet and outlet being in flow communication with each other so the fluid flow is around said common housing means, said vessel including nozzle means spaced for receiving the fluid flow from said vessel fluid inlet and converting said fluid flow into a relatively higher velocity fluid flow for impinging on said one turbine arranged for receiving said fluid flow for rotating said shaft.

4. A hydraulic turbine-electrical power generator as defined in claim 3 wherein said main drive gear comprises a bevel drive gear and said individual gears comprise bevel gears.

5. A hydraulic-electrical power generator as defined in claim 4 including a rotatable positioning shaft arranged coaxially with said single shaft assembly and secured for permitting the rotation thereof to rotate said main drive gear.

6. A hydraulic turbine-electrical power generator as defined in claim 5 wherein said positioning shaft is accessible outside of said hydraulic turbine-electrical power generator and including support means secured to the discharge end of said draft tube means and mounting motor means having an axially, bidirectional, movable blade for engaging said positioning shaft for imparting rotary forces thereto upon the energization of said motor means.

7. A hydraulic turbine-electrical power generator as defined in claim 3 wherein said axial turbine runner means includes stepping motor means mounted to said single shaft and having a positioning shaft coupled to said main drive gear for incrementally actuating said drive gear for incrementally changing the pitch of the adjustable blades.

8. A hydraulic turbine-electrical power generator comprising a single shaft assembly having first and second ends for mounting a hydraulic turbine and an electrical power generator thereon between said ends, said shaft assembly being bidirectionally axially movable, hydraulic turbine means mounted adjacent a first end of the shaft, first bearing means mounted on said shaft for said turbine, said power generator comprising an electrical induction generator mounted on said shaft on the opposite side of said bearing means from said turbine means to be rotatably responsive to the rotary movements imparted to said shaft upon the operation of said turbine means and in accordance with the speed thereof, second bearing means mounted to said shaft adjacent the second end of said shaft, said hydraulic turbine means comprising at least a plurality of reaction type turbine stages arranged in serial fashion to be serially rotatably responsive to a fluid flow coupled thereto, the first of said reaction type turbines comprising at least a single stage having radial runner means mounted to said shaft to be rotatably responsive to a high velocity fluid flow to rotate said shaft at a speed in accordance with the hydraulic pressure and velocity of the fluid impinging thereon and discharging the fluid flow at a relatively low velocity and pressure into a second of said reaction type turbines comprising at least a single stage having an axially turbine runner means mounted to said shaft to be rotatably responsive to the discharged fluid flow from the first reaction type turbine, said axial runner means being further characterized as having a plurality of adjustable blades for permitting the pitch of the blades to be adjusted for maximizing the efficiency of said second reaction type turbine and thereby the power recovery from a liquid stream and for achieving a pre-selected shaft speed, said axial runner means includes means for adjusting the pitch of said adjustable blades, the plurality of reaction type turbine stages are pre-selected to have reverse performance characteristics so that, in combination, the effective operative head of said hydraulic turbine means is controlled to achieve a pre-selected operating speed for rotating said shaft and thereby the production of electrical current from said power generator of a single electrical frequency, said hydraulic turbine means including thrust equalizing means mounted to said shaft between said first bearing means and said radial runner means of said first reaction type turbines, a common housing means for said hydraulic turbine means and said induction generator for enclosing and isolating said shaft between said opposite end of said shaft and said turbine means including said thrust equalizing means, said housing terminating adjacent said axial turbine runner means of said second reaction type turbines whereby said runner means and the remaining portion of said shaft is outside said common housing, said first bearing means having an inner race mounted to said shaft and an outer race loosely mounted against said common housing means to permit the shaft to move axially, bidirectionally, relative to said housing a pre-selected distance, containment vessel means mounted over and in spaced relationship with said common housing and said remaining portion of said shaft and extending axially outwardly of said common housing and remaining portion of said shaft, said vessel having a fluid flow inlet adjacent said first bearing means end of said vessel and a fluid flow outlet at the opposite end thereof, said fluid inlet and outlet being in a flow communication with each other so the fluid flow is around said housing means, said vessel including nozzle means spaced for receiving the fluid flow from said vessel fluid inlet and converting said fluid flow into a relatively higher velocity fluid flow for impinging on said runner means of said first reaction type turbine for rotating said shaft, draft tube means secured to said common housing for enclosing said axial turbine runner means and adapted for coupling the fluid flow from said radial runner stage to said axial turbine runner and discharging the fluid flow therefrom, said draft tube means functioning to slow down the fluid flow and increase the back pressure at said axial turbine runner means to thereby aid the turbine in the recovery of pressure, said axial turbine runner means includes means for adjusting the pitch of the adjustable blades thereon, said thrust equalizing means comprising a stationary thrust plate ring means secured to the common housing adjacent to said first bearing means and extending axially outwardly of said bearing means, said runner means including throttling ring means constructed and defined integrally with said runner on one side thereof for coaction with said thrust plate for defining a substantially fixed orifice for receiving a portion of said high velocity fluid flow coupled to impinge on said runner means and a variable orifice defined between the throttling ring and the thrust plate and varying in size in accordance with the bidirectional movements of said shaft and receiving said fluid at such variable orifice from said fixed orifice, the fluid conveyed to said variable orifice flows through said first bearing means thereby cooling and lubricating the bearing and into said common housing to thereby cool said induction generator, and conduit means coupled to said common housing adjacent said second bearing means and to the low pressure fluid flow outlet for said vessel for conveying said coolant liquid to said outlet, said thrust equalizing means including first wear ring means secured to said common housing for coaction with said throttling ring means and second wear ring means secured to said containment vessel for coaction with the discharge end of said runner means of said first reaction type turbine, the diametrical spacing of said first wear ring means is constructed and defined to be larger than the diametrical spacing of said second ring means for creating thrust forces upon the application of hydraulic fluid thereto effective to cause the shaft assembly to move in response thereto and in direction therewith until the thrust plate ring means engages said throttling ring means whereby said variable orifice closes and thereby throttles the fluid flow into the variable orifice, the closed condition of the variable orifice defines a chamber between said first wear ring means and the closed variable orifice allowing fluid pressure to build up therein so when the pressure is build up in said chamber to a pre-selected level sufficient for counteracting said created thrust forces and thereby producing movement of said shaft assembly away from said engaged position of said thrust plate ring means and the throttling ring means and then causing the flow of fluid into the variable orifice accompanied by the reduction of the pressure built up in said chamber whereby the balancing of the generated thrust forces occurs gradually and smoothly and without overshoot with the bidirectional axial movements of the shaft assembly.

9. A hydraulic turbine-electrical power generator as defined in claim 8 wherein said first reaction type turbine is at least a single stage of a Francis type turbine and said second reaction type turbine is a Kaplan type turbine.

10. A hydraulic turbine-electrical power generator as defined in claim 8 wherein said axial turbine runner means includes gear drive means secured to said axial turbine runner means and rotatably coupled to each of said adjustable blades thereof for permitting the pitch of the blades to be varied in accordance with the desired fluid flow there through for maximizing the efficiency of said axial turbine means, and a rotatable positioning shaft coupled to said gear drive means for actuating the drive means to vary the pitch of said adjustable blades in response to rotary motions imparted to said positioning shaft.

11. A hydraulic turbine-electrical power generator as defined in claim 9 wherein said axial turbine runner means includes a main drive gear secured to said axial runner means and rotatable in response to rotary motion imparted thereto, and individual gears coupled to be driven by said main gear and individually secured to an individual adjustable blade for said axial turbine runner to very the pitch thereof in accordance with the rotary motion coupled to said individual gears by said main drive gear.

12. A hydraulic turbine-electrical power generator comprising a single shaft assembly having first and second ends for mounting a hydraulic turbine and an electrical power generator thereon between said ends, said shaft assembly being bidirectionally axially movable, hydraulic turbine means mounted adjacent a first end of the shaft, first bearing means mounted on said shaft for said turbine, said power generator comprising an electrical induction generator mounted on said shaft on the opposite side of said bearing means from said turbine means to be rotatably responsive to the rotary movements imparted to said shaft upon the operation of said turbine means and in accordance with the speed thereof, second bearing means mounted to said shaft adjacent the second end of said shaft, said hydraulic turbine means comprising at least a plurality of reaction type turbine stages arranged in serial fashion to be serially rotatably responsive to a fluid flow coupled thereto, the first of said reaction type turbines comprising at least a single stage having radial runner means mounted to said shaft to be rotatably responsive to a high velocity fluid flow to rotate said shaft at a speed in accordance with the hydraulic pressure and velocity of the fluid impinging thereon and discharging the fluid flow at a relatively low velocity and pressure into a second of said reaction type turbines comprising at least a single stage having an axially turbine runner means mounted to said shaft to be rotatably responsive to the discharged fluid flow from the first reaction type turbine, said axial runner means being further characterized as having a plurality of adjustable blades for permitting the pitch of the blades to be adjusted for maximizing the efficiency of said second reaction type turbine and thereby the power recovery from a liquid stream and for achieving a pre-selected shaft speed, said axial runner means includes means for adjusting the pitch of said adjustable blades comprising a main drive gear secured to said axial runner means and rotatable in response to rotary motion imparted thereto, and individual gears coupled to be driven by said main drive gear and individually secured to an individual adjustable blade for said axial turbine runner to vary the pitch thereof in accordance with the rotary motion coupled to said individual gears by said main drive gear, said main drive gear comprises a bevel drive gear and said individual gears comprise bevel gears coupled to be responsive to the rotary motion imparted to the main drive bevel gear, the plurality of reaction type turbine stages are pre-selected to have reverse performance characteristics so that, in combination, the effective operative head of said hydraulic turbine means is controlled to achieve a pre-selected operating speed for rotating said shaft and thereby the production of electrical current from said power generator of a single electrical frequency, said hydraulic turbine means including thrust equalizing means mounted to said shaft between said first bearing means and said radial runner means of said first reaction type turbines, a common housing means for said hydraulic turbine means and said induction generator for enclosing and isolating said shaft between said opposite end of said shaft and said turbine means including said thrust equalizing means, said housing terminating adjacent said axial turbine runner means of second reaction type turbines whereby said runner means and the remaining portion of said shaft is outside said common housing, said first bearing means having an inner race mounted to said shaft and an outer race loosely mounted against said common housing means to permit the shaft to move axially, bidirectionally, relative to said housing a pre-selected distance, containment vessel means mounted over and in spaced relationship with said common housing and said remaining portion of said shaft and extending axially of said common housing and remaining portion of said shaft, said vessel having a fluid flow inlet adjacent said first bearing means end of said vessel and a fluid flow outlet at the opposite end thereof, said fluid inlet and outlet being in flow communication with each other so the fluid flow is around said common housing means, said vessel including nozzle means spaced for receiving the fluid flow from said vessel fluid inlet and converting said fluid flow into a relatively higher velocity fluid flow for impinging on said runner means of said first reaction type turbine for rotating said shaft, draft tube means secured to said common housing for enclosing said axial turbine runner means and adapted for coupling the fluid flow from said radial runner stage to said axial turbine runner and discharging the fluid flow therefrom, said draft tube means functioning to slow down the fluid flow and increase the back pressure at said axial turbine runner means to thereby aid the turbine in the recovery of pressure, said thrust equalizing means comprising a stationary thrust plate ring means secured to the common housing adjacent to said first bearing means and extending axially outwardly of said bearing means, said runner means including throttling ring means constructed and defined integrally with said runner on one side thereof for coaction with said thrust plate for defining a substantially fixed orifice for receiving a portion of said high velocity fluid flow coupled to impinge on said runner means and a variable orifice defined between the throttling ring and the thrust plate and varying in size in accordance with the bidirectional movements of said shaft and receiving said fluid at such variable orifice from said fixed orifice, the fluid conveyed to said variable orifice flows through said first bearing means thereby cooling and lubricating the bearing and into said common housing to thereby cool said induction generator, and conduit means coupled to said common housing adjacent said second housing means and to the low pressure fluid flow outlet for said vessel for conveying said coolant liquid to said outlet, said thrust equalizing means including first ring means secured to said common housing for coaction with said throttling ring means and second wear ring means secured to said containment vessel for coaction with the discharge end of said runner means of said first reaction type turbine, the diametrical spacing of said first wear ring means is constructed and defined to be larger than the diametrical spacing of said second wear ring means for creating thrust forces upon the application of hydraulic fluid thereto effective to cause the shaft assembly to move in response thereto and in a direction therewith until the thrust plate ring means engages said throttling ring means whereby said variable orifice closes and thereby throttles the fluid flow into the variable orifice, the closed condition of the variable orifice defines a chamber between said first wear ring means and the closed variable orifice allowing fluid pressure to build up therein so when the pressure is build up in said chamber to a pre-selected level sufficient for counteracting said created thrust forces and thereby producing movement of said shaft assembly away from said engaged position of said thrust plate ring means and the throttling ring means and then causing the flow into the variable orifice accompanied by the reduction of the pressure built up in said chamber whereby the balancing of the generated thrust force occurs gradually and smoothly and without overshoot with the bidirectional axial movements of the shaft assembly.

13. A hydraulic turbine-electrical power generator comprising a single shaft assembly having first and second ends for mounting a hydraulic turbine and an electrical power generator thereon between said ends, said shaft assembly being bidirectionally axially movable, hydraulic turbine means mounted adjacent a first end of the shaft, first bearing means mounted on said shaft for said turbine, said power generator comprising an electrical induction generator mounted on said shaft on the opposite side of said bearing means from said turbine means to be rotatably responsive to the rotary movements imparted to said shaft upon the operation of said turbine means and in accordance with the speed thereof, second bearing means mounted to said shaft adjacent the second end of said shaft, said hydraulic turbine means comprising at least a plurality of reaction type turbine stages arranged in serial fashion to be serially rotatably responsive to a fluid flow coupled thereto, the first of said reaction type turbines comprising at least a single stage having radial runner means mounted to said shaft to be rotatably responsive to a high velocity fluid flow to rotate said shaft at a speed in accordance with the hydraulic pressure and velocity of the fluid impinging thereon and discharging the fluid flow at a relatively low velocity and pressure into a second of said reaction type turbines comprising at least a single stage having an axially turbine runner means mounted to said shaft to be rotatably responsive to the discharged fluid flow from the said first reaction type turbine, said axial runner means being further characterized as having a plurality of adjustable blades for permitting the pitch of the blades to be adjusted for maximizing the efficiency of said second reaction type turbine and thereby the power recovery from a liquid stream and for achieving a pre-selected shaft speed, said axial runner means includes means for adjusting the pitch of said adjustable blades including a main drive gear secured to said axial runner means and rotatable in response to rotary motion imparted thereto, and individual gears coupled to be driven by said main drive gear and individually secured to an individual adjustable blade for said axial turbine runner means to vary the pitch thereof in accordance with the rotary motion coupled to said individual gears by said main drive gear, the plurality of reaction type turbine stages are pre-selected to have reverse performance characteristics so that, in combination, the effective operative head of said hydraulic turbine means is controlled to achieve a pre-selected operating speed for rotating said shaft and thereby the production of electrical current from said power generator of a single electrical frequency, said hydraulic turbine means including thrust equalizing means mounted to said shaft between said first bearing means and said radial runner means of said first reaction type turbines, a common housing means for said hydraulic turbine means and said induction generator for enclosing and isolating said shaft between said opposite end of said shaft and said turbine means including said thrust equalizing means, said housing terminating adjacent said axial turbine runner means of second reaction type turbines whereby said runner means and the remaining portion of said shaft is outside said common housing, said first bearing means having an inner race mounted to said shaft and an outer race loosely mounted against said common housing means to permit the shaft to move axially, bidirectionally, relative to said housing a pre-selected distance.

containment vessel means mounted over and in spaced relationship with said common housing and said remaining portion of said shaft and extending axially outwardly of said common housing and remaining portion of said shaft, said vessel having a fluid flow inlet adjacent said first bearing means end of said vessel and a fluid flow outlet at the opposite end thereof, said fluid inlet and outlet being in flow communication with each other so the fluid flow is around said common housing means, said vessel including nozzle means spaced for receiving the fluid flow from said vessel fluid inlet and converting said fluid flow into a relatively higher velocity fluid flow for impinging on said runner means of first reaction type turbine for rotating said shaft, draft tube means secured to said common housing for enclosing said axial turbine runner means and adapted for coupling the fluid flow from said radial runner stage to said axial turbine runner and discharging the fluid flow therefrom, said draft tube means functioning to slow down the fluid flow and increase the back pressure at said axial turbine runner means to thereby aid the turbine in the recovery of pressure, said thrust equalizing means comprising a stationary thrust plate ring means secured to the common housing adjacent to said first bearing means and extending axially outwardly of said bearing means, said runner means including throttling ring means constructed and defined integrally with said runner on one side thereof for coaction with thrust plate for defining a substantially fixed orifice for receiving a portion of said high velocity fluid flow coupled to impinge on said runner means and a variable orifice defined between the throttling ring and the thrust plate and varying in size in accordance with the bidirectional movements of said shaft and receiving said fluid at such variable orifice from said fixed orifice, the fluid conveyed to said variable orifice flows through said first bearing means thereby cooling and lubricating the bearing and into said common housing to thereby cool said induction generator, conduit means coupled to said common housing adjacent said second bearing means and the low pressure fluid flow outlet for said vessel for conveying said coolant liquid to said outlet, said thrust equalizing means including first wear ring means secured to said common housing for coaction with said throttling ring means and second wear ring means secured to said containment vessel for coaction with the discharge end of said runner means of said first reaction type turbine, the diametrical spacing of said first wear ring means is constructed and defined to be larger than the diametrical spacing of said second wear ring means for creating thrust forces upon the application of hydraulic fluid thereto effective to cause the shaft assembly to move in response thereto and in a direction therewith until the thrust plate ring means engages said throttling ring means whereby said orifice closes and thereby throttles the fluid flow into the variable orifice, the closed condition of the variable orifice defines a chamber between said first ring means and the closed variable orifice allowing fluid pressure to build up therein so when the pressure is build up in said chamber to a pre-selected level sufficient for counteracting said created thrust forces and thereby producing movement of said shaft assembly away from said engaged position of said thrust plate ring means and the throttling ring means and then causing the flow of fluid into the variable orifice accompanied by the reduction of the pressure built up in said chamber whereby the balancing of the generated thrust force occurs gradually and smoothly and without overshoot with the bidirectional axial movements of the shaft assembly, and a rotatable positioning shaft arranged coaxially with said single shaft assembly and accessible outside of said hydraulic turbine-electrical power generator, said positioning shaft being secured for rotating said main drive gear upon imparting rotary forces to said positioning shaft.

14. A hydraulic turbine-electrical power generator as defined in claim 10 including bracket means mounted to the exit end of said draft tube means for supporting motor means having an axially movable blade for engaging the positioning shaft for imparting rotary forces thereto upon energization of said motor means and thereby varying the pitch of said adjustable blades when said turbine-electrical power generator is not operative.

15. A hydraulic turbine-electrical power generator as defined in claim 10 wherein said axial turbine runner means includes stepping motor means having a rotor securing a positioning shaft rotatable in unison therewith, the rotor having a plurality of spaced magnetic poles defined thereon and a stator having a corresponding plurality of energizable windings spaced around the rotor for defining stator poles when energized, the energization of the stator windings is controlled for coaction with the rotor poles to cause the rotor to sequentially travel towards the rotor poles and sequentially snap in alignment therewith and thereby incrementally advance the rotor and said positioning shaft, said stepper motor positioning shaft being coupled to said gear drive means for varying the pitch of said adjustable blades in accord with the incremental movements of said positioning shaft, the electrical power source for energizing the windings of the stepper motor being derived from said electrical induction generator coupled by lead wires arranged within a pre-selected aperture in said single shaft from said generator to said stepper motor windings.

16. A hydraulic turbine-electrical power generator as defined in claim 10 wherein said axial turbine runner means includes stepper motor means having a positioning shaft mounted coaxially with said single shaft assembly and powered from said power generator and adapted to be responsive to digital control signals for incrementally rotating the positioning shaft, said stepper motor positioning shaft being coupled to said gear drive means for varying the pitch of said adjustable blades.

17. A method of generating electrical power at a pre-selected single electrical frequency comprising of steps of providing a single shaft having first and second ends and having hydraulic turbine means and an electrical power generator mounted thereon, the hydraulic turbine being mounted adjacent a first end of the single shaft, mounting first bearing means on said shaft for said turbine means adjacent said first end of the single shaft, mounting a second bearing means to said shaft adjacent the second end of said shaft, mounting said electrical power generator adjacent said second bearing means to be rotatably responsive to the rotary movements of said shaft upon the operation of said turbine means and in accordance with the rotary speed thereof, selecting a plurality of reaction type turbine means for mounting on said shaft for controlling the operative fluid flow head for the plurality of turbine means, one of the selected turbine means having radial turbine runner means mounted to be rotatably responsive to the fluid flow coupled thereto for rotating said shaft at a pre-selected speed, the other of the selected turbine means having axial turbine runner means mounted to be rotatably responsive to the fluid coupled thereto whereby the combination of the plurality of turbine means control the rotary speed of the single shaft for causing the electrical power generator to provide electrical power at a single electrical frequency related to the rotary speed of the single shaft, said axial turbine runner means having adjustable blades for controlling the pitch thereof and the fluid flow there through for permitting the effective operative fluid head of the combination of said plurality of reaction type turbine means to be controlled for controlling the rotary speed of the shaft to a pre-selected speed, said turbine means including means for adjusting the pitch of the adjustable blades for controlling the operating speed of said shaft, the plurality of reaction type turbine means being further characterized as having reverse fluid performance flow so that the shaft speed is controlled by the combination of the flow performance characteristics of the plurality of reaction type turbine means, adjusting the pitch of the adjustable blades of said axial turbine means for causing the shaft to rotate at a pre-selected, single speed, conveying a fluid flow having a pre-selected fluid flow head, velocity and fluid pressure to said radial turbine runner means for rotating said shaft and discharging the resulting fluid flow through said axial turbine means for further rotating said shaft in combination with the response of said radial runner means whereby a single rotary speed and thereby a single electrical frequency is achieved for the generated power.

18. A hydraulic turbine electrical power generator operative at a pre-selected speed as defined in claims 8 or 9 wherein said hydraulic turbine-electrical power generator is oriented to have the fluid flow coupled to said turbine means is caused to flow substantially upwardly through said turbine stages and discharged from said last mentioned turbine runner means, and the fluid source comprises a two phase fluid means including liquids and a gas or vapor in combination therein, and the fluid discharged from said last mentioned turbine runner means is a mixture of said gas or vapor and a liquid, said hydraulic turbine power generator assembly being further characterized as being mounted inside of a closed container means having a fluid inlet means for receiving and conveying the input two phase fluid flow into said fluid flow inlet adjacent said second bearing means end of said vessel to be conveyed substantially vertically upward to said vessel nozzle means, said container means having a gas or vapor outlet means arranged at the opposite end of said closed container means from said container fluid inlet means and a liquid outlet means arranged intermediate said ends of said closed container means, the closed container means functioning as a separator of the gas/vapor from the liquid of the input fluid mixture as a result of the reduction in fluid pressure of the liquid mixture driving said turbine stages whereby the gas/vapor rises vertically outwardly of said draft tube means to exit through said gas/vapor outlet means while the heavier liquid flow descends outwardly from said draft tube means downwardly to exit said closed container means through said liquid outlet means for said container means.

19. A hydraulic turbine electrical power generator operative at a preselected speed as defined in claim 1 or 8 wherein the hydraulic turbine electrical power generator is oriented to cause fluid flow coupled to said turbine means to flow in a substantially vertical flow through the hydraulic turbine means, and a source of fluid under pressure coupling the fluid to be processed to said fluid flow inlet, said turbine means functioning as a fluid expander of the fluid under pressure coupled thereto whereby any dissolved secondary gas may be released and the fluid flow may evaporate resulting in a liquid/gas or liquid/vapor flow through said turbine means and through said fluid outlet.

20. A hydraulic turbine electrical power generator as defined in claim 19 wherein at least one of said hydraulic turbine means is operative at a preselected speed with the adjustment of said adjustable blades of said another turbine stage.

21. A hydraulic turbine electrical power generator as defined in claim 8 wherein said single stage hydraulic turbine means having radial runner means is rotatably responsive to the fluid flow coupled thereto for rotating said single shaft in accordance with the hydraulic pressure and velocity of the fluid impinging thereon.

* * * * *